(12) United States Patent
Parduhn et al.

(10) Patent No.: US 8,474,780 B2
(45) Date of Patent: Jul. 2, 2013

(54) CABLE RETAINER FOR UTILITY POLE BASE

(75) Inventors: A. Philip Parduhn, Edmond, OK (US); Raymond M. Woods, Edmond, OK (US); Scott R. Talley, Edmond, OK (US)

(73) Assignee: Pelco Products, Inc., Edmond, OK (US)

( * ) Notice: Subject to any disclaimer, the term of this patent is extended or adjusted under 35 U.S.C. 154(b) by 346 days.

(21) Appl. No.: 12/755,067

(22) Filed: Apr. 6, 2010

(65) Prior Publication Data

US 2011/0095162 A1    Apr. 28, 2011

Related U.S. Application Data

(60) Provisional application No. 61/167,009, filed on Apr. 6, 2009.

(51) Int. Cl.
*F16M 13/00* (2006.01)

(52) U.S. Cl.
USPC ................ 248/551; 248/65; 248/73; 248/519

(58) Field of Classification Search
USPC ................... 174/45 R; 248/519, 65, 73, 74.1, 248/74.4, 551; 29/825
See application file for complete search history.

(56) References Cited

U.S. PATENT DOCUMENTS

| | | | | |
|---|---|---|---|---|
| 3,343,322 A * | 9/1967 | Lurkis et al. | | 52/298 |
| 4,051,525 A * | 9/1977 | Kelly | | 348/143 |
| 4,243,834 A | 1/1981 | Logioco | | |
| 5,058,838 A * | 10/1991 | Velke et al. | | 248/50 |
| 5,156,047 A * | 10/1992 | Tuma et al. | | 73/304 C |
| 5,216,203 A * | 6/1993 | Gower | | 174/663 |
| 5,641,939 A * | 6/1997 | Tourigny | | 174/45 R |
| 6,327,833 B1 * | 12/2001 | Miskelley et al. | | 52/848 |
| 6,830,225 B2 * | 12/2004 | Kato | | 248/49 |
| 7,392,569 B2 * | 7/2008 | Sharkey et al. | | 24/16 R |
| 7,723,612 B2 | 5/2010 | Butler | | |
| 7,765,770 B2 * | 8/2010 | Fournier | | 52/843 |
| 2009/0301777 A1 | 12/2009 | Yribarren | | |
| 2011/0111646 A1 * | 5/2011 | Ahmed | | 439/719 |

* cited by examiner

*Primary Examiner* — Terrell McKinnon
(74) *Attorney, Agent, or Firm* — Mary M. Lee

(57) ABSTRACT

A cable retainer assembly for use inside utility pole base assembly. The cable retainer is anchored to the foundation using the same bolts as the pole base. The cable retainer discourages pole-to-pole cable theft by securing the copper conductor cables to the foundation and pole base plate below the handhole in the pole. Access to the clamps of the cable retainer may be prevented by including a blocking structure positioned between the cable retainer and the handhole in the pole base.

64 Claims, 9 Drawing Sheets

CABLE RETAINER FOR UTILITY POLE BASE

CROSS-REFERENCE TO RELATED APPLICATION(S)

This application claims the benefit of provisional application Ser. No. 61/167,009, filed Apr. 6, 2009, entitled "Cable Retainer," the contents of which are incorporated herein by reference.

FIELD OF THE INVENTION

The present invention relates generally to traffic control equipment and utility lighting, more particularly but without limitation, to devices for securing conductors inside utility pole bases.

DETAILED DESCRIPTION OF THE PREFERRED EMBODIMENT(S)

Figure 1:
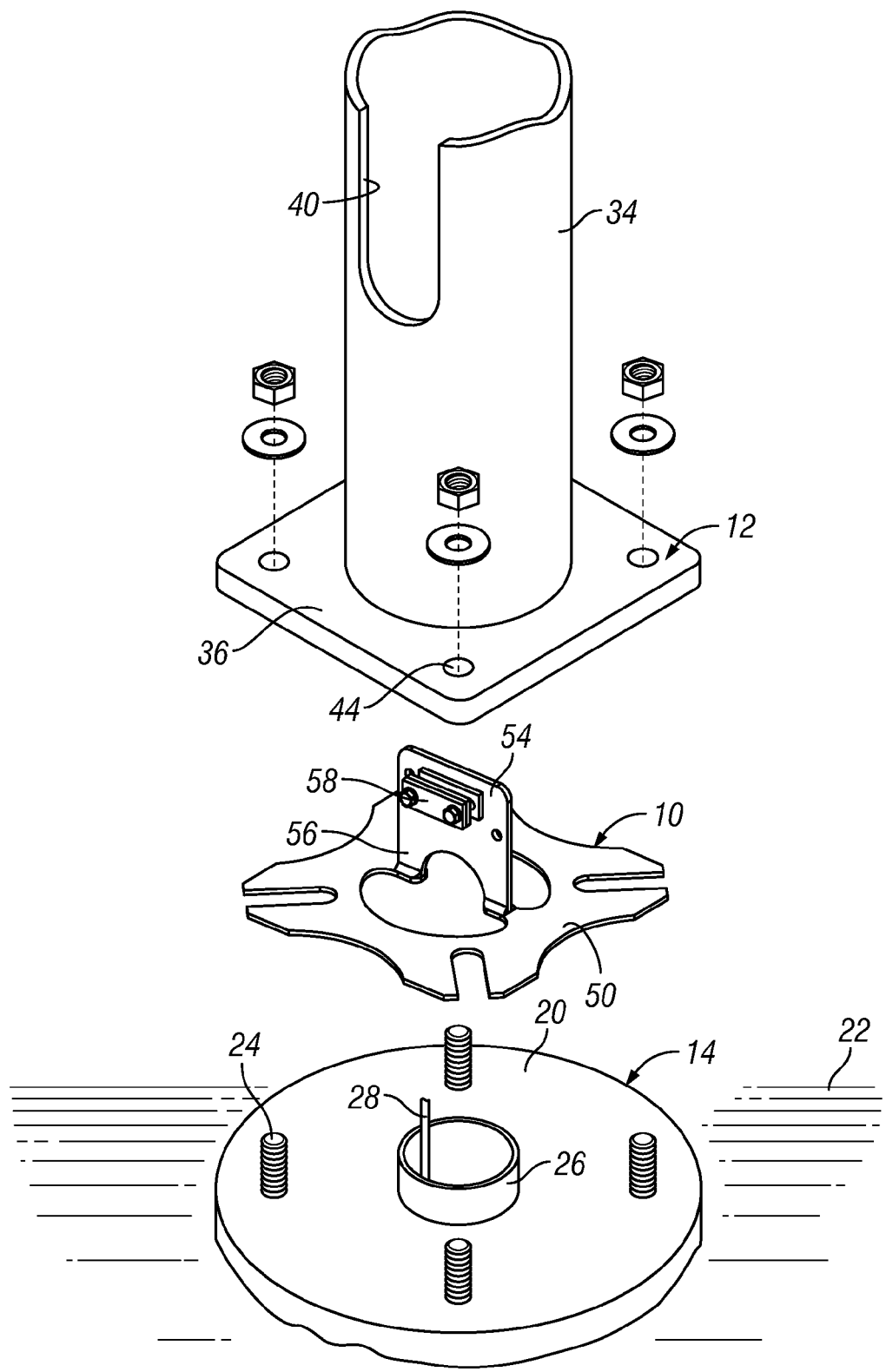
FIG. 1 is an exploded, perspective view of a utility pole base assembly comprising a cable retainer assembly constructed in accordance with a first preferred embodiment of the present invention. The copper conductor has been cut away to simplify the illustration.
Figure 2:
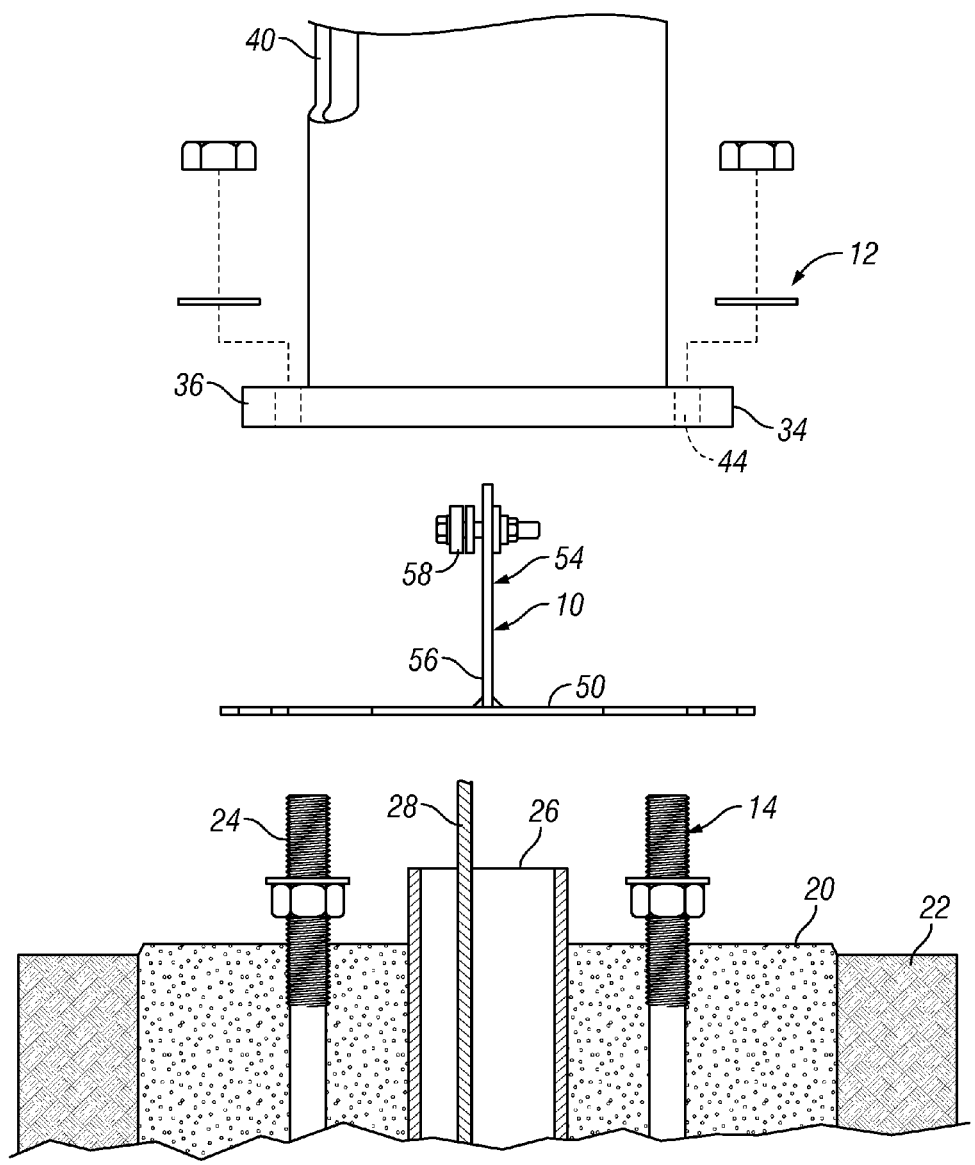
FIG. 2 shows an exploded, partially fragmented side elevational view of the utility pole base assembly shown in FIG. 1. The copper conductor has been cut away to simplify the illustration.
Figure 3:
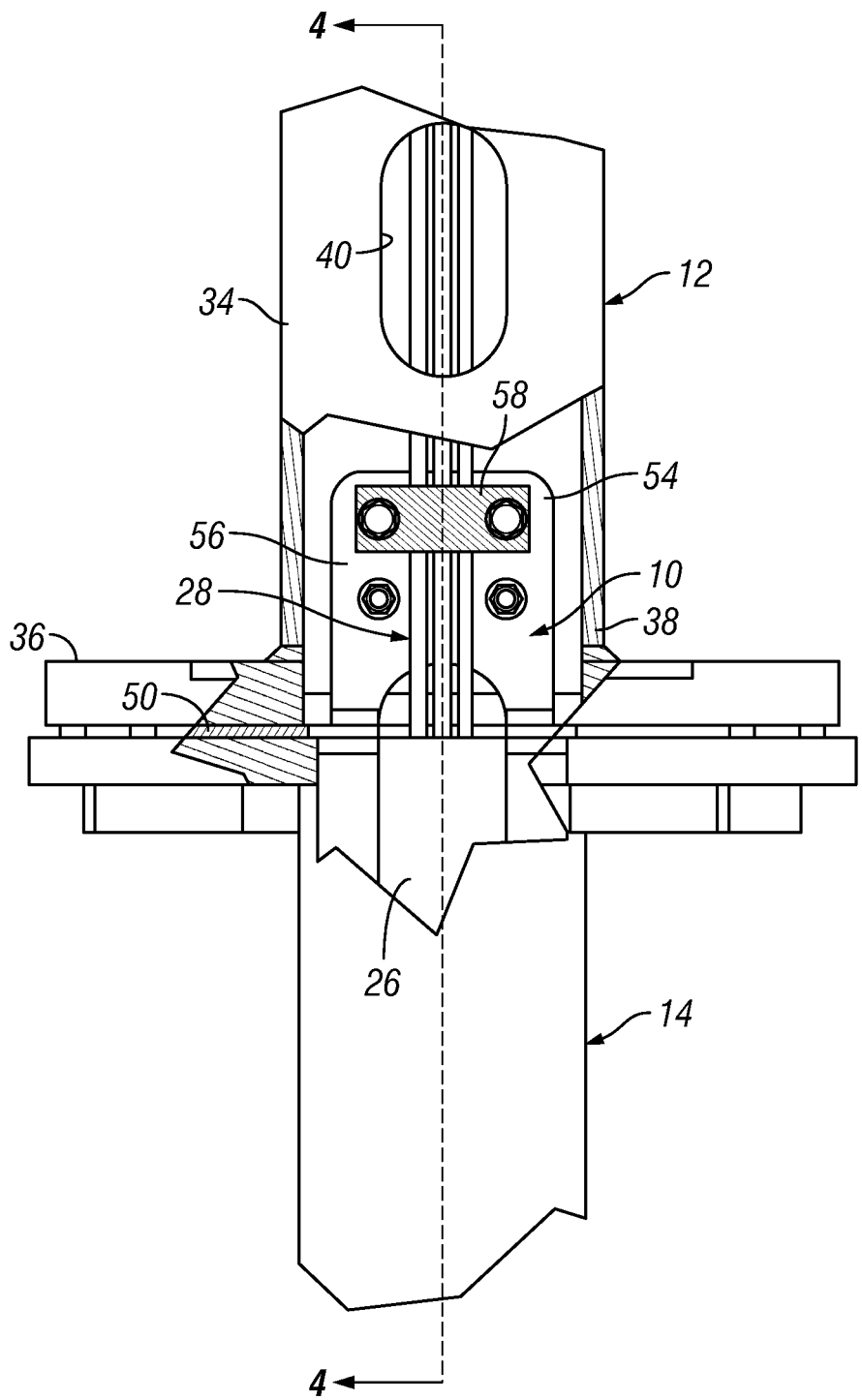
FIG. 3 is a partially fragmented, front elevational view of the utility pole base assembly shown in FIG. 1.
Figure 4:
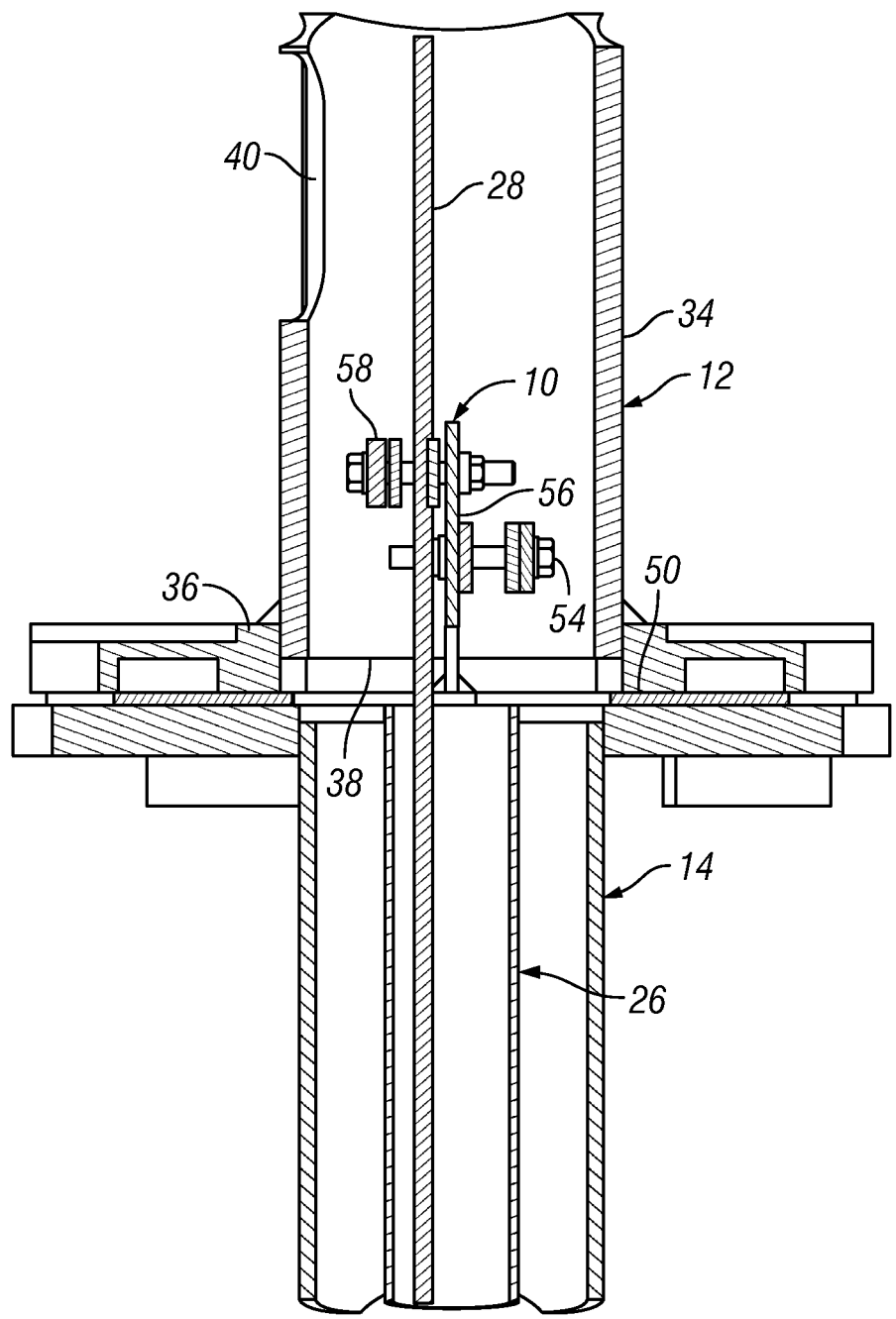
FIG. 4 is a sectional side view of the assembled utility pole base assembly of FIG. 3. The cable retainer is shown with two clamps, one of which is secured to the conductor cable. The other clamp is shown empty merely for illustration purposes.

The wire cables (conductors) that supply the electrical components of traffic control equipment and utility lighting supported on poles often run from pole to pole in a series. Because the wiring is copper, it has substantial intrinsic value and is vulnerable to theft. The most common means of stealing this copper cable involves accessing the cables inside the pole base, usually through the handhole. The cables are cut in two consecutive poles, and then the entire length of wire between the two poles is pulled out at either end. Theft of copper wiring is a major expense across the country.

The present invention provides a cable retainer for use inside the base of the utility pole below the handhole. The cable retainer is secured to the pole's foundation and clamps onto the conductor securely. The base plate of most utility poles typically has a standard four-bolt connection, and the base plate of the present assembly is configured to be "sandwiched" in between the existing support structures. In this way, no additional connectors or retrofitting is required. Once installed, the conductor cannot be pulled through the base without extraordinary effort on the part of the thief.

Turning now to the drawings in general and to FIGS. 1-4 in particular, shown therein and designated generally by the reference numeral 10 a cable retainer constructed in accordance with a preferred embodiment. The cable retainer 10 is shown installed inside a utility pole base assembly 12 mounted on a foundation assembly 14.

The foundation assembly 14 comprises a foundation, shown herein as a concrete footing 20 embedded in the earth 22. The assembly 14 further comprises a plurality of anchor bolts 24 supported in the footing 20. "Bolts" refers to the bolts and any nuts and washers that are necessary to complete the connection secured by the bolt. Also supported, usually in about the center of the footing 20 is a conduit 26 for housing at least one and typically several conductor cables 28. As used herein, "foundation" refers to any structure adapted to support a utility pole and includes without limitation concrete footings 20, as shown herein, and screw-in anchors.

The utility pole base assembly 12 generally comprises a pole base 34 with a base plate 36. The base plate 36 usually is welded to the lower open end 38 of the pole base 34. The utility pole base 34 usually is integrally formed with the utility pole (not shown in its entirety) that supports at least one utility or traffic control device (not shown) that requires electricity that is supplied by the conductor cable 28. As used herein "pole base" refers to the lower end of the utility pole, such as a luminaire type pole. The pole base 34 preferably also includes an access opening, such as a handhole 40.

As used herein, "utility pole" refers to any vertically-oriented pole used to support a utility or traffic control device. As used herein, "utility or traffic control device(s)" means any electrical device for controlling the direction, flow, illumination, and safety of all forms of vehicular and pedestrian traffic, such as traffic signals, lights for illumination of roadways, parking lots, and walkways, signs, and warning devices, such as lights, signs, and horns.

The utility pole base plate 36 includes a plurality of anchor bolt holes 44. The bolt holes 44 as sized and positioned in the base plate 36 so as to align with the anchor bolts 24 in the foundation or footing 20.

The cable retainer 10 is sized and configured generally to fit inside the pole base 34 and to be anchored to the footing 20 with the anchor bolts 24. To that end, the cable retainer 10 includes a base plate 50 configured to be positioned between the footing 20 or other foundation and the base plate 36 of the pole assembly 12. Also included in the cable retainer 10 is a retainer assembly, designated generally at 54, supported on the base plate 50. The retainer assembly 54 includes a support 56 and a clamp 58 on the support. The clamp 58 is positioned on the support 56 to grip the conductor cable(s) 28 inside the pole base 34.

Having described the cable retainer 10 generally and how it resides inside the pole base 34 and is anchored between the base plate 36 of the pole and the footing 20, a particularly preferred embodiment for the cable retainer 10 now will be described. Referring now to FIGS. 5-8, the base plate 50 may take any shape, but a generally square configuration is preferred, as it provides for corners designated generally at 62. The base plate 50 includes a conductor opening 64 sized to receive the conductor cable(s) 28 (FIGS. 1-4), and usually this opening will be centered in the plate.

The base plate 50 also includes a plurality of anchor bolt holes 66 that are sized and positioned to receive the anchor bolts 24 in the footing 20 to align with the anchor bolt holes 44 in the base plate 36 of the pole base assembly 12. The anchor bolt holes 66 in the base plate 50 may take any shape, but it is preferred for these holes to take the form of open notches or slots extending radially inward from the corners 62.

Figure 5:
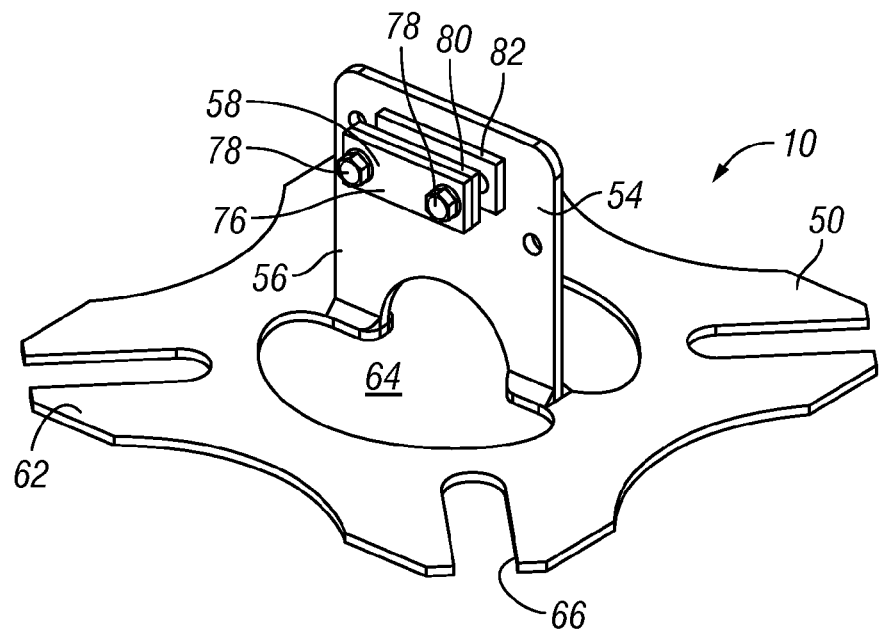
FIG. 5 is a perspective view of the assembled cable retainer without the copper conductor cable.
Figure 6:
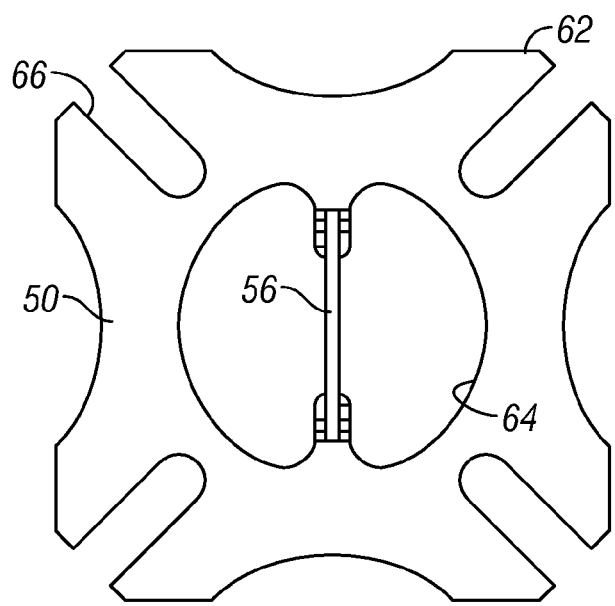
FIG. 6 is a plan view of the cable retainer shown in FIG. 5. The clamp assembly is omitted to simplify the illustration.
Figure 7:
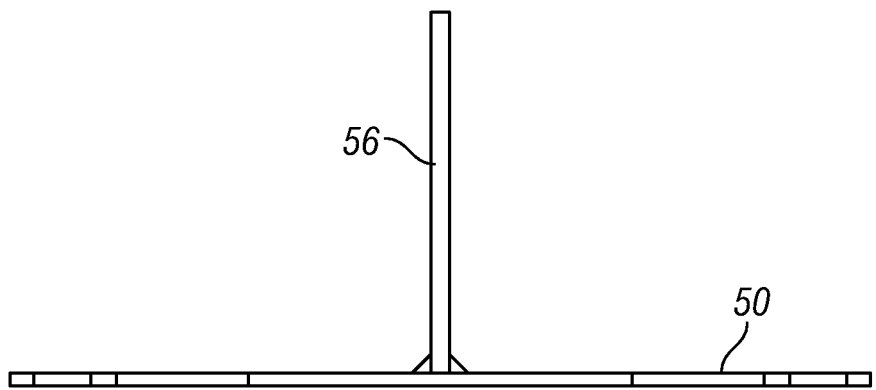
FIG. 7 is a side elevational view of the cable retainer shown in FIG. 6.
Figure 8:
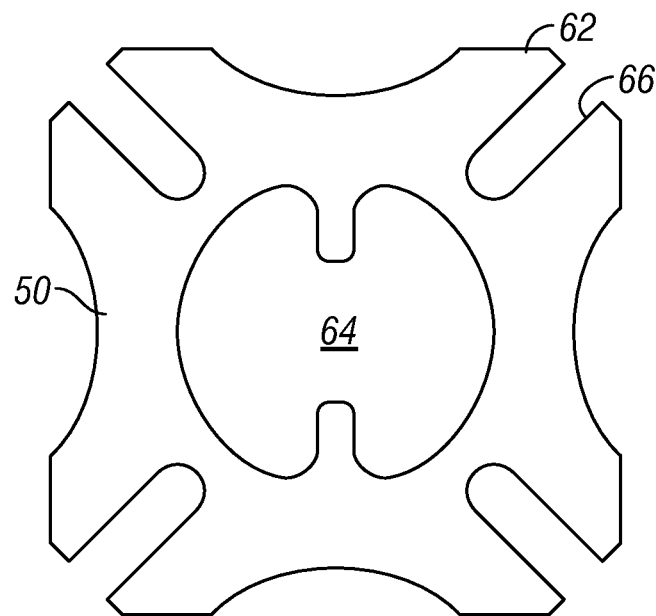
FIG. 8 is a plan view of the base plate of the cable retainer.

Referring still to FIGS. 5 and 6 and now also to FIGS. 9-13, the preferred retainer assembly 54 will be described. The support 56 conveniently is a planar member such as the plate shown best in FIG. 9. Preferably, the support plate 56 is placed across the center of the base plate 50 so that it extends upward vertically from the plate and spans the conductor cable opening 64 as this will position it inside and at the bottom of the pole base 34 and directly over the conduit 26 that passes down through the footing 20 or other foundation. It will be understood that many other structures will perform equally well for supporting the clamp 58. The support plate 56 may be integrally formed with the base plate 50, permanently affixed to it as by welding, or attached in any other suitable manner.

The preferred support plate 56 includes several bolt holes, designated generally at 70, for the bolts of the retainer assembly 54 yet to be described. The bolt holes 70 may be provided in pairs, and preferably several pairs of holes will be included to allow flexibility in the positioning and number of the conductor cables 28 that may be secured to the plate 56. In the embodiment shown there are three sets of bolt holes designated at 70a, 70b, and 70c.

Figure 9:
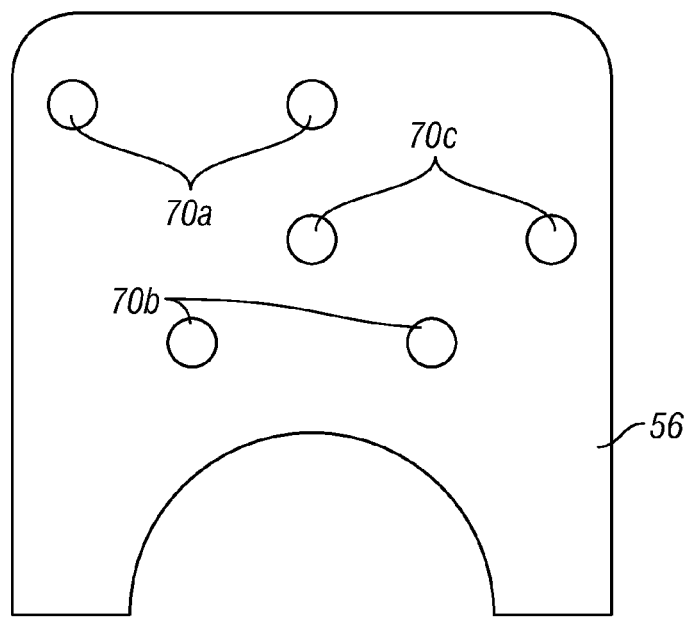
FIG. 9 is a front elevational view of the retainer support of the cable retainer.
Figure 10:
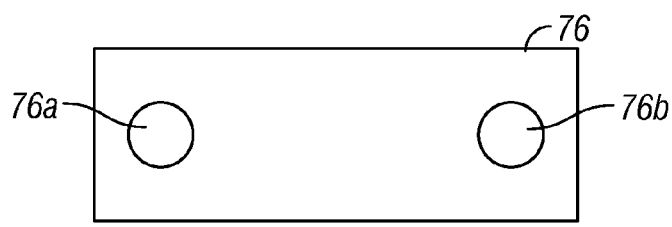
FIG. 10 is a front elevational view of the retainer bar of the cable retainer.
Figure 11:
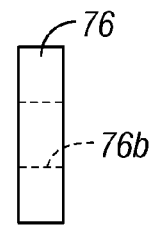
FIG. 11 is an end elevational view of the retainer bar of FIG. 12.

Referring now also to FIGS. 10-13, a preferred clamp structure will be explained. The clamp may take several forms but generally should be capable of frictionally securing the conductor cable(s) 28 to the support plate 56, and thus to the footing 20. To that end, one suitable clamp 58 comprises a retainer bar 76 removably attachable to the support plate 56. For example, the bar 76 may be attached to the plate 56 with a pair of retainer bolts 78 receivable in bolt holes 76a and 76b that are positioned to align with one of the pairs of bolt holes 70a, 70b, and 70c (FIG. 9).

Figure 12:
FIG. 12 is a front elevational view of the retainer pad of the cable retainer.
Figure 13:
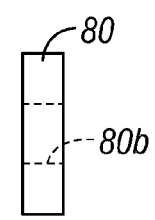
FIG. 13 is an end elevational view of the retainer pad of FIG. 14.

In order to protect the insulation around the conductor cable(s) 28 and to provide additional frictional engagement between the retainer bar 76 and plate 56 and the cable 28 therebetween, the clamp 58 may also include at least one and preferably two retainer pads 80 and 82. The retainer pads 80 and 82 may be identical and only the pad 80 is shown in FIGS. 12 and 13. Preferably the pads 80 and 82 include bolt holes, such as the bolt holes 80a and 80b. Multiple clamps 58 may be used, the number limited only by available space and the number of bolt holes 70 provided in the support plate 56. The use of retainer pads also allows the clamp to be used with conductor cables of different sizes.

The base plate 50 and support plate 56 preferably are fabricated from ASTM A-36 or equivalent steel sheet material. Hardware, such as the various bolts, may be Type 304 stainless steel. The threads in the nuts (unnumbered) may have a wax coating to reduce the likelihood of seizing, or galling, on the stainless steel bolts. All fabricated steel components preferably are hot dip galvanized per ASTM 123. The pads 80 and 82 preferably are formed of a material that has a relatively high coefficient of friction, that is, a frictional coefficient that is high enough to prevent the conductor cables 28 from slipping in the clamp 58. A particularly preferred material for the retainer pads 80 and 82 is 90 durometer red urethane. This material may be die cut to the desired size and shape, has a suitably high coefficient of friction, and also possesses the desired insulating capability between the conductive copper cable(s) 28 and the metal clamp(s) 58.

Because the retainer assembly is positioned at the very bottom of the pole base, it is extremely difficult to access and cut the captured cables without removing the pole and base. Most preferably, the wires are twisted together below the retainer bar, as this makes it even more difficult to cut and withdraw the cables. This discourages all but the most dedicated thieves.

Figure 14:
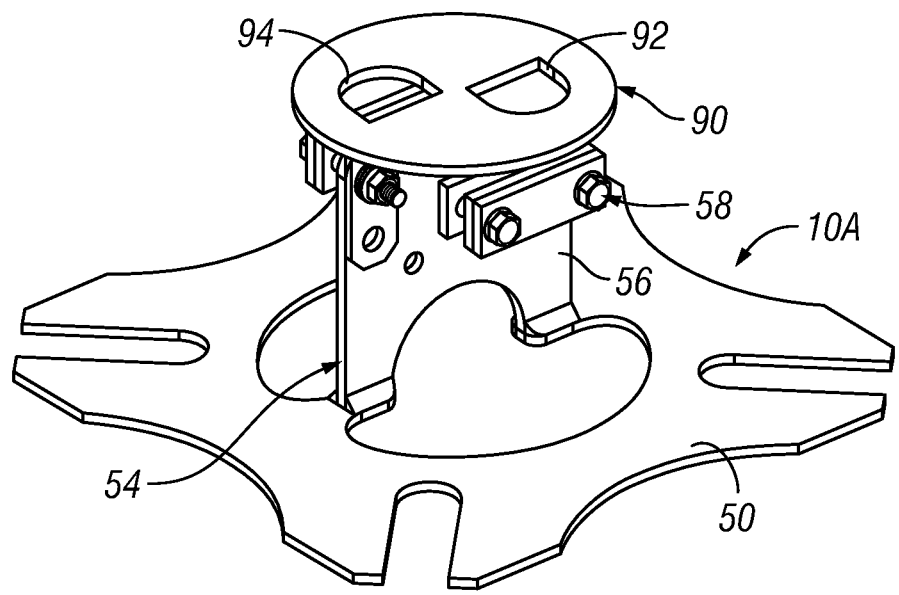
FIG. 14 is a perspective view of another preferred embodiment of the cable retainer of the present invention comprising an attached blocking guide plate.
Figure 15:
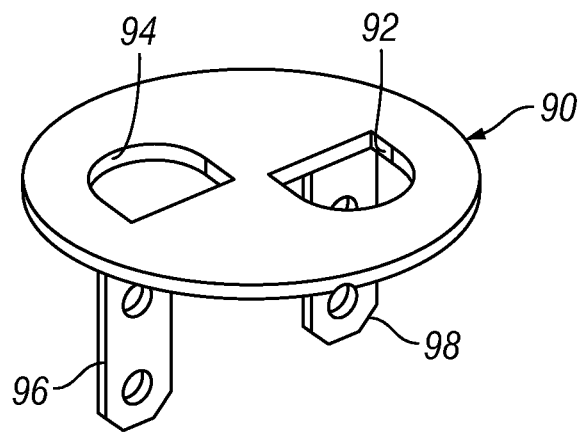
FIG. 15 is an enlarged perspective view of the blocking plate comprising depending bolt brackets for attachment to the cable retainer support.

To provide an additional obstacle to removal of the cable, a blocking structure may be attached to or made a part of the cable retainer 10. Shown in FIGS. 14 and 15 is another embodiment of the cable retainer of the present invention, designated generally at 10A. The cable retainer 10A comprises a base plate 50 and a retainer assembly 54 as in the previous embodiment. The cable retainer 10A further comprises a blocking structure. The blocking structure may be a solid or perforate structure designed to obstruct access to the installed retainer assembly 54 through the handhole 40 (FIGS. 1 & 3) of the pole 34.

In the embodiment of FIGS. 14 and 5, the blocking structure takes the form of a panel or plate 90 that sits above the retainer assembly 54 and below the handhole. The structure preferably accommodates the passage of the conductor cables 28 (FIG. 4) through it. For that purpose, the blocking plate 90 may include one and preferably two conductor openings 92 and 94 positioned so as to be directly above the clamp(s) 58. The openings 92 and 94 should be sized to easily receive the conductor cables 28 but small enough to prevent the insertion of a wrench or other tool. As shown, the plate 90 is generally round, but other shapes may be used instead.

Figure 16:
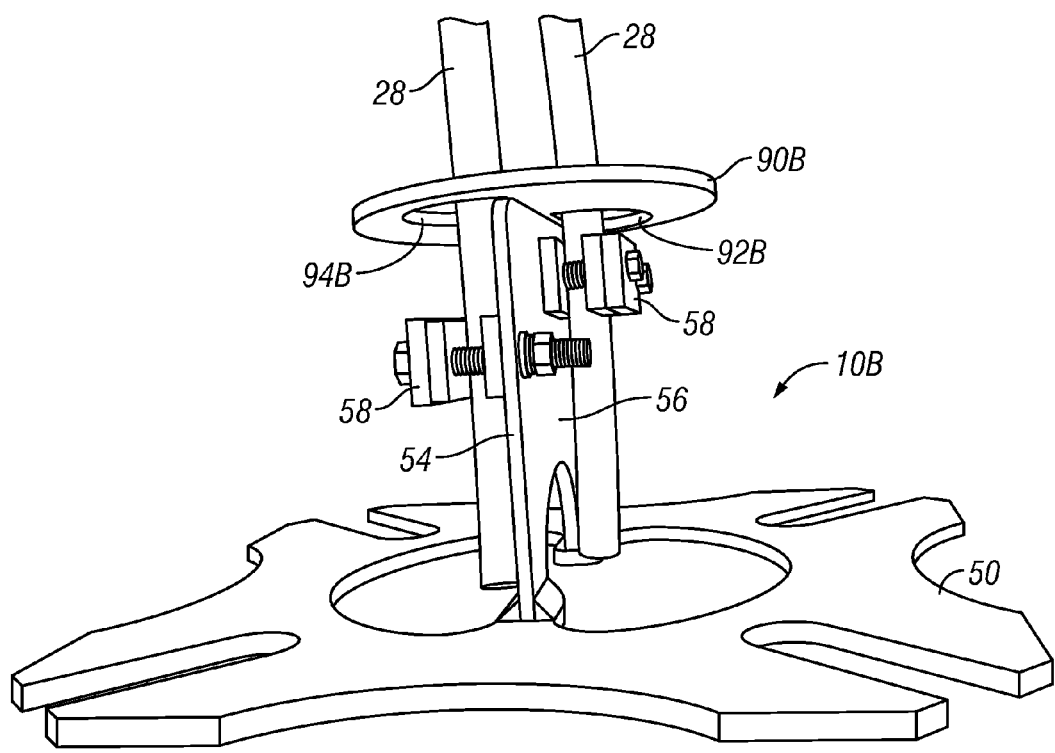
FIG. 16 is an enlarged perspective view of yet another embodiment of the present invention comprising a cable retainer with an integral blocking plate.

The plate 90 in FIGS. 14 and 15 is shown attached to the support plate 56 by a pair of depending brackets 96 and 98 (FIG. 15). The brackets 96 and 98 ideally will be attached by using the retainer bolts 78 (FIG. 5) that form part of the clamps 58. Yet another embodiment is seen in FIG. 16 which shows a cable retainer 10B with a plate 90B that is made integral with the support plate 56, as by welding.

Now it will be apparent that the blocking plate (or other structure) deters even the most industrious thief from removing the copper conductor cable. It is virtually impossible to remove the cable from a pole base equipped with the cable retainer and blocking structure of the present invention without removing the entire pole base.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A cable retainer for securing at least one conductor cable inside a utility pole base assembly mounted on a foundation assembly, wherein the utility pole base assembly comprises a pole base and a base plate with a plurality of anchor bolt holes, wherein the foundation assembly comprises a foundation with a cable conduit, wherein the at least one conductor cable extends up through the cable conduit in the foundation assembly and into the pole base, wherein the foundation comprises a plurality of anchor bolts, and wherein the anchor bolt holes in the utility pole base plate are sized and positioned to align with the anchor bolts in the foundation, the cable retainer comprising:
   a retainer assembly securable to the foundation assembly, the retainer assembly comprising at least one clamp sized and positioned to grip frictionally the at least one cable conductor; and
   a cable retainer base plate having a conductor cable opening sized to permit the at least one conductor cable to extend therethrough and also having a plurality of anchor bolt holes sized and positioned to receive the anchor bolts in the foundation and to align with the anchor bolt holes in the utility pole base plate, and wherein the base plate is configured to be positioned between the foundation and the utility pole base plate.

2. The cable retainer of claim 1 wherein each of the plurality of anchor bolt holes in the cable retainer base plate comprises a slot.

3. The cable retainer of claim 2 wherein the cable retainer base plate is generally square and each of the slots extends radially through each corner.

4. The cable retainer of claim 3 wherein each of the slots is open at the corner.

5. The cable retainer of claim 1 wherein the retainer assembly comprises a support plate that extends vertically upward from the cable retainer base plate.

6. The cable retainer of claim 5 wherein the conductor cable opening in the base plate is generally centered in the base plate and wherein the support plate is positioned to span the cable conductor opening.

7. The cable retainer of claim 6 wherein clamp of the retainer assembly comprises at least one retainer bar removably attachable to the support plate and sized to capture the cable conductor therebetween.

8. The cable retainer of claim 7 wherein the clamp of the retainer assembly further comprises at least one retainer pad for each retainer bar, the at least one retainer pad removably attachable to the support plate between the retainer bar and the support plate.

9. The cable retainer of claim 8 wherein the at least one retainer pad comprises at least two retainer pads for each retainer bar, the at least two retainer pads removably attachable to the support plate between the retainer bar and the support plate, one of the at least two retainer pads on each side of the conductor cable.

10. The cable retainer of claim 9 wherein the least one retainer bar comprises at least two retainer bars.

11. The cable retainer of claim 7 further comprising at least one retainer bolt for removably attaching the at least one retainer bar to the support plate.

12. The cable retainer of claim 11 wherein the at least one retainer bolt comprises two retainer bolts for removably attaching each of the at least one retainer bar to the support plate.

13. The cable retainer of claim 1 wherein the retainer assembly comprises a support and wherein the clamp of the retainer assembly comprises at least one retainer bar removably attachable to the retainer support and sized to grippingly capture the conductor cable therebetween.

14. The cable retainer of claim 13 wherein the clamp of the retainer assembly further comprises at least one retainer pad for each retainer bar, the at least one retainer pad removably attachable to the retainer support between the retainer bar and the support.

15. The cable retainer of claim 14 wherein the at least one retainer pad comprises at least two retainer pads for each retainer bar, the at least two retainer pads removably attachable to the retainer support between the retainer bar and the support, one of the at least two retainer pads on each side of the conductor cable.

16. The cable retainer of claim 15 wherein the least one retainer bar comprises at least two retainer bars.

17. The cable retainer of claim 13 further comprising at least one retainer bolt for removably attaching the at least one retainer bar to the retainer support.

18. The cable retainer of claim 17 wherein the at least one retainer bolt comprises two retainer bolts for removably attaching each of the at least one retainer bar to the retainer support.

19. The cable retainer of claim 1 wherein the at least one clamp comprises two clamps.

20. The cable retainer of claim 1 further comprising a blocking structure positioned above the at least one clamp and configured to obstruct access to the at least one clamp from above the cable retainer.

21. The cable retainer of claim 20 wherein the blocking structure is a plate.

22. The cable retainer of claim 21 wherein the blocking plate comprises a conductor opening for each of the at least one conductor cables in the pole base assembly.

23. The cable retainer of claim 22 wherein the blocking plate is removable attached to the support of the retainer assembly.

24. The cable retainer of claim 22 wherein the blocking plate is integral to the support of the retainer assembly.

25. A utility pole base assembly comprising the cable retainer of claim 1.

26. The utility pole base assembly of claim 25 wherein the foundation is a concrete footing.

27. The utility pole base assembly of claim 25 wherein the foundation is a screw-in anchor.

28. A cable retainer for securing at least one conductor cable inside a utility pole base mounted on a foundation assembly, the foundation assembly comprising a foundation with a cable conduit, wherein the at least one conductor cable extends up through the cable conduit in the foundation assembly and into the pole base, the cable retainer comprising;
   a cable retainer base plate having a conductor cable opening sized to permit the at least one conductor cable to extend therethrough, wherein the conductor cable opening is generally centered in the cable retainer base plate; and
   a retainer assembly securable to the foundation assembly, the retainer assembly comprising:

a support plate that extends vertically upward from the cable retainer base plate and that is positioned to span the conductor cable opening; and at least one clamp on the support plate sized and positioned to grip frictionally the at least one conductor cable.

29. The cable retainer of claim 28 wherein the utility pole base is part of utility pole base assembly that comprises a utility pole base and a utility pole base plate with a plurality of anchor bolt holes, wherein of the foundation assembly comprises a plurality of anchor bolts supported therein, wherein the plurality of anchor bolt holes in the utility pole base plate are sized and positioned to align with the anchor bolts in the foundation, and wherein each of the plurality of anchor bolt holes in the cable retainer base plate comprises a slot.

30. The cable retainer of claim 29 wherein the cable retainer base plate is generally square and each of the slots extends radially through each corner.

31. The cable retainer of claim 30 wherein each of the slots is open at the corner.

32. The cable retainer of claim 28 wherein clamp of the retainer assembly comprises at least one retainer bar removably attachable to the support plate and sized to capture the cable conductor therebetween.

33. The cable retainer of claim 32 wherein the clamp of the retainer assembly further comprises at least one retainer pad for each retainer bar, the at least one retainer pad removably attachable to the support plate between the retainer bar and the support plate.

34. The cable retainer of claim 32 wherein the at least one retainer pad comprises at least two retainer pads for each retainer bar, the at least two retainer pads removably attachable to the support plate between the retainer bar and the support plate, one of the at least two retainer pads on each side of the conductor cable.

35. The cable retainer of claim 34 wherein the least one retainer bar comprises at least two retainer bars.

36. The cable retainer of claim 32 further comprising at least one retainer bolt for removably attaching the at least one retainer bar to the support plate.

37. The cable retainer of claim 36 wherein the at least one retainer bolt comprises two retainer bolts for removably attaching each of the at least one retainer bar to the support plate.

38. The cable retainer of claim 28 wherein the at least one clamp comprises two clamps.

39. The cable retainer of claim 28 further comprising a blocking structure positioned above the at least one clamp and configured to obstruct access to the at least one clamp from above the cable retainer.

40. The cable retainer of claim 39 wherein the blocking structure is a plate.

41. The cable retainer of claim 40 wherein the blocking plate comprises a conductor opening for each of the at least one conductor cables in the pole base assembly.

42. The cable retainer of claim 41 wherein the blocking plate is removable attached to the support of the retainer assembly.

43. The cable retainer of claim 41 wherein the blocking plate is integral to the support of the retainer assembly.

44. A utility pole base assembly comprising the cable retainer of claim 28.

45. The utility pole base assembly of claim 44 wherein the foundation is a concrete footing.

46. The utility pole base assembly of claim 44 wherein the foundation is a screw-in anchor.

47. A cable retainer for securing at least one conductor cable inside a utility pole base mounted on a foundation assembly, the foundation assembly comprising a foundation with a cable conduit, wherein the at least one conductor cable extends up through the cable conduit in the foundation assembly and into the pole base, the cable retainer comprising;

a retainer assembly secured to the foundation assembly, the retainer assembly comprising at least one clamp sized and positioned to grip frictionally the at least one cable conductor; and a blocking structure positioned above the at least one clamp and configured to obstruct access to the at least one clamp from above the cable retainer.

48. The cable retainer of claim 47 wherein the utility pole base is part of utility pole base assembly that comprises a utility pole base and a utility pole base plate with a plurality of anchor bolt holes, wherein of the foundation assembly comprises a plurality of anchor bolts supported therein, wherein the plurality of anchor bolt holes in the utility pole base plate are sized and positioned to align with the anchor bolts in the foundation, and wherein each of the plurality of anchor bolt holes in the cable retainer base plate comprises a slot.

49. The cable retainer of claim 48 wherein the cable retainer base plate is generally square and each of the slots extends radially through each corner.

50. The cable retainer of claim 49 wherein each of the slots is open at the corner.

51. The cable retainer of claim 47 wherein the retainer assembly comprises a support and wherein the clamp of the retainer assembly comprises at least one retainer bar removably attachable to the retainer support and sized to grippingly capture the conductor cable therebetween.

52. The cable retainer of claim 51 wherein the clamp of the retainer assembly further comprises at least one retainer pad for each retainer bar, the at least one retainer pad removably attachable to the retainer support between the retainer bar and the support.

53. The cable retainer of claim 52 wherein the at least one retainer pad comprises at least two retainer pads for each retainer bar, the at least two retainer pads removably attachable to the retainer support between the retainer bar and the support, one of the at least two retainer pads on each side of the conductor cable.

54. The cable retainer of claim 53 further comprising at least one retainer bolt for removably attaching the at least one retainer bar to the retainer support.

55. The cable retainer of claim 54 wherein the at least one retainer bolt comprises two retainer bolts for removably attaching each of the at least one retainer bar to the retainer support.

56. The cable retainer of claim 51 wherein the least one retainer bar comprises at least two retainer bars.

57. The cable retainer of claim 47 wherein the at least one clamp comprises two clamps.

58. The cable retainer of claim 47 wherein the blocking structure is a plate.

59. The cable retainer of claim 58 wherein the blocking plate comprises a conductor opening for each of the at least one conductor cables in the pole base assembly.

60. The cable retainer of claim 59 wherein the blocking plate is removable attached to the support of the retainer assembly.

61. The cable retainer of claim 59 wherein the blocking plate is integral to the support of the retainer assembly.

62. A utility pole base assembly comprising the cable retainer of claim 47.

63. The utility pole base assembly of claim 62 wherein the foundation is a concrete footing.

64. The utility pole base assembly of claim 62 wherein the foundation is a screw-in anchor.

* * * * *

UNITED STATES PATENT AND TRADEMARK OFFICE
CERTIFICATE OF CORRECTION

PATENT NO. : 8,474,780 B2  
APPLICATION NO. : 12/755067  
DATED : July 2, 2013  
INVENTOR(S) : A. Philip Parduhn Page 1 of 1

It is certified that error appears in the above-identified patent and that said Letters Patent is hereby corrected as shown below:

In the Specification  
Column 4, line 32: replace "FIGS. 14 and 5," with --FIGS. 14 and 15,--.

In the Claims  
Claim 7, line 51: replace "wherein clamp" with --wherein the clamp--.  
Claim 10, line 66: replace "wherein the least one" with --wherein the at least one--.  
Claim 16, line 24: replace "wherein the least one" with --wherein the at least one--.  
Claim 23, line 45: replace "removable" with --removably--.  
Claim 29, line 8: replace "part of utility" with --part of the utility--.  
Claim 29, line 10: replace "wherein of the" with --wherein the--.  
Claim 32, line 22: replace "wherein clamp" with --wherein the clamp--.  
Claim 35, line 37: replace "wherein the least one" with --wherein the at least one--.  
Claim 42, line 58: replace "removable" with --removably--.  
Claim 48, line 16: replace "part of utility" with --part of the utility--.  
Claim 48, line 18: replace "wherein of the" with --wherein the--.  
Claim 56, line 52: replace "wherein the least one" with --wherein the at least one--.  
Claim 60, line 62: replace "removable" with --removably--.

Signed and Sealed this  
Seventeenth Day of September, 2013

Teresa Stanek Rea  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,474,780 B2 | Page 1 of 1 |
| APPLICATION NO. | : 12/755067 | |
| DATED | : July 2, 2013 | |
| INVENTOR(S) | : A. Philip Parduhn | |

It is certified that error appears in the above-identified patent and that said Letters Patent is hereby corrected as shown below:

In the Specification
Column 4, line 32: replace "FIGS. 14 and 5," with --FIGS. 14 and 15,--.

In the Claims

Column 5
Claim 7, line 51: replace "wherein clamp" with --wherein the clamp--.
Claim 10, line 66: replace "wherein the least one" with --wherein the at least one--.

Column 6
Claim 16, line 24: replace "wherein the least one" with --wherein the at least one--.
Claim 23, line 45: replace "removable" with --removably--.

Column 7
Claim 29, line 8: replace "part of utility" with --part of the utility--.
Claim 29, line 10: replace "wherein of the" with --wherein the--.
Claim 32, line 22: replace "wherein clamp" with --wherein the clamp--.
Claim 35, line 37: replace "wherein the least one" with --wherein the at least one--.
Claim 42, line 58: replace "removable" with --removably--.

Column 8
Claim 48, line 16: replace "part of utility" with --part of the utility--.
Claim 48, line 18: replace "wherein of the" with --wherein the--.
Claim 56, line 52: replace "wherein the least one" with --wherein the at least one--.
Claim 60, line 62: replace "removable" with --removably--.

This certificate supersedes the Certificate of Correction issued September 17, 2013.

Signed and Sealed this
Fifteenth Day of October, 2013

Teresa Stanek Rea
*Deputy Director of the United States Patent and Trademark Office*